April 10, 1962
T. C. WHISLER, SR
3,028,696
SLUSHING SCRAPERS
Filed Sept. 24, 1959
3 Sheets-Sheet 2
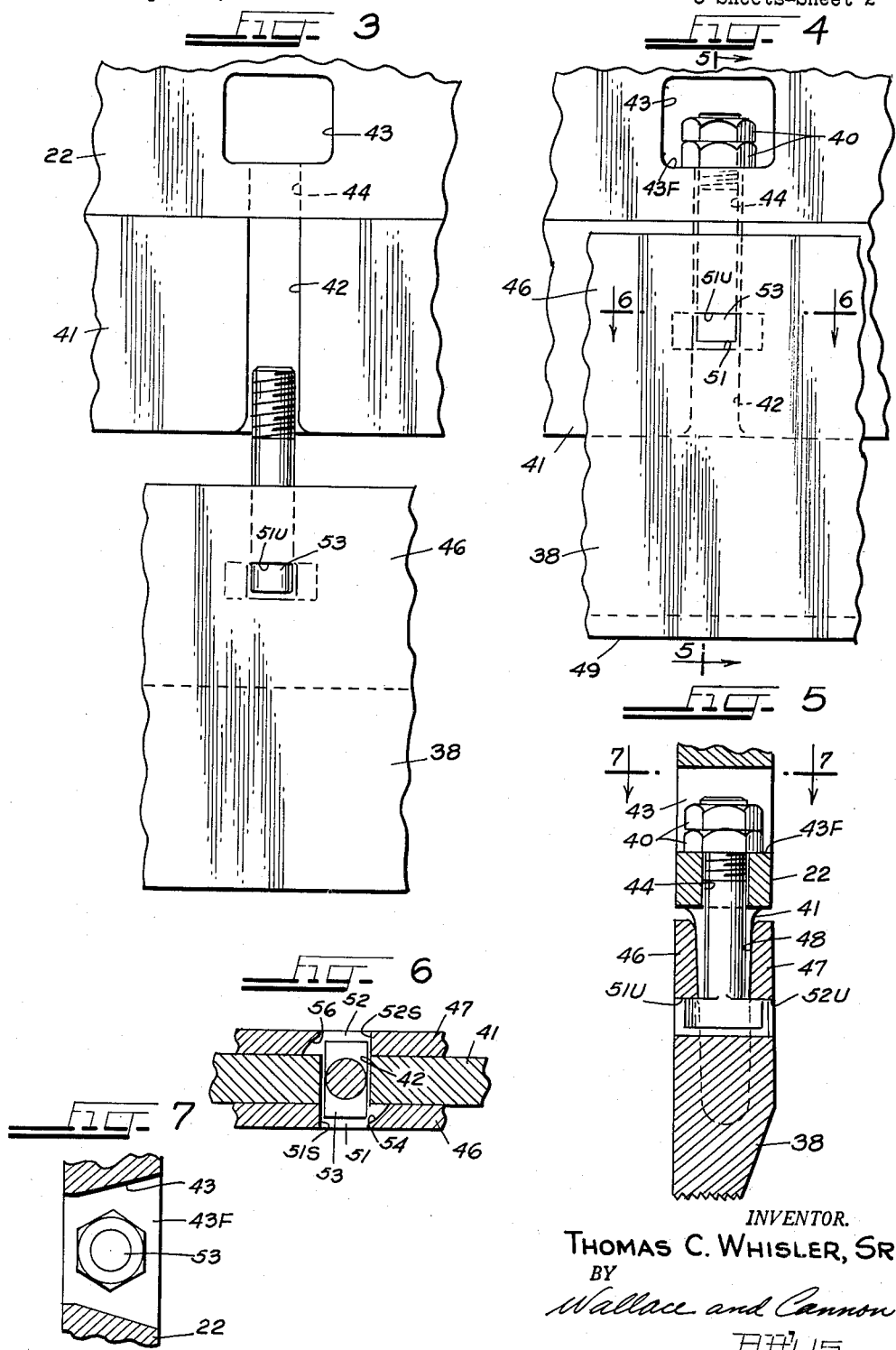
INVENTOR.
THOMAS C. WHISLER, SR.
BY
Wallace and Cannon
ATTYS.

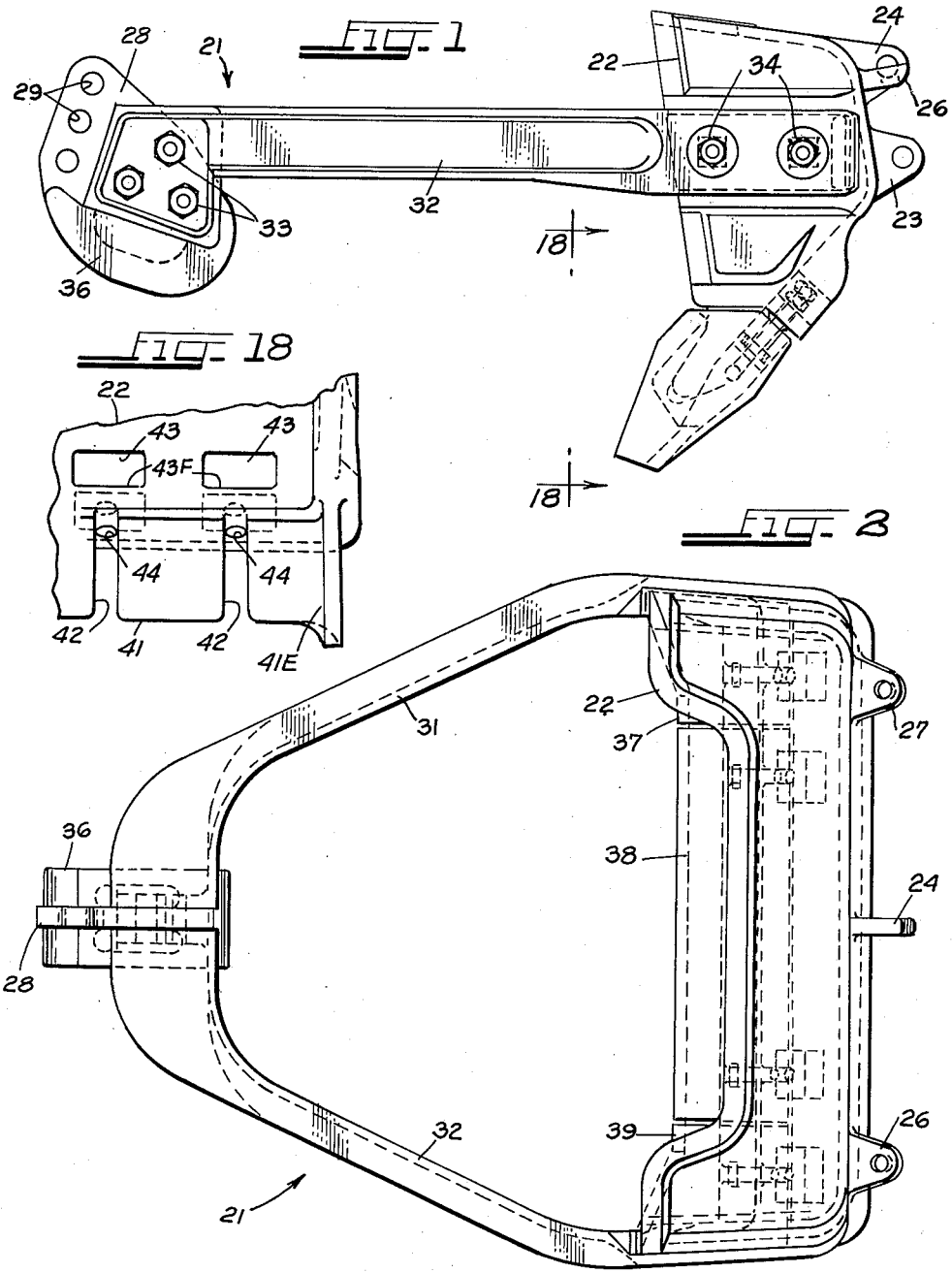

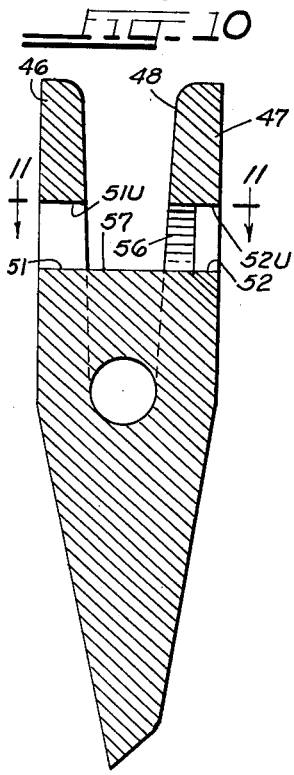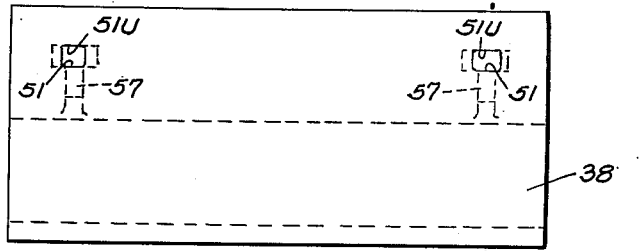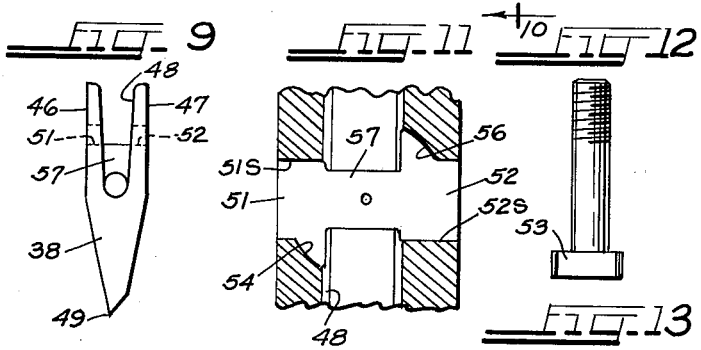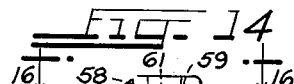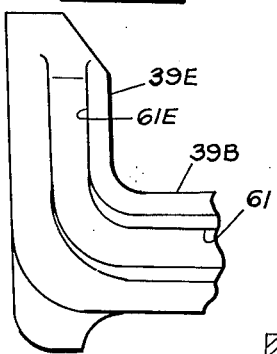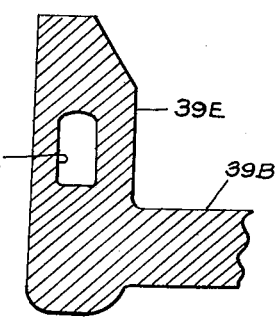

United States Patent Office 3,028,696
Patented Apr. 10, 1962

3,028,696
SLUSHING SCRAPERS
Thomas C. Whisler, Sr., Alameda, Calif., assignor to American Brake Shoe Company, New York, N.Y., a corporation of Delaware
Filed Sept. 24, 1959, Ser. No. 842,055
7 Claims. (Cl. 37—141)

This application relates to a slushing scraper of a type commonly operated by a line.

Slushing scrapers, otherwise known as scraper buckets are generally pulled along a trough by a drag line in a manner such that a lower blade portion of the scraper scrapes and scoops material into the interior of a bucket formed by a main body portion of the scraper. Such scrapers are widely utilized in mines, especially strip mines, and in construction work as well as in many other applications in which it is desired to remove large quantities of material from a given location.

It will be appreciated that the blade, which actually digs into and scrapes off a portion of the surface of the material over which the scraper is being pulled, is subject to a very high degree of abrasive action. Therefore the blades of the scraper tend to wear down much more rapidly than the other component parts of the scraper with the result that the blade portion of the scraper often may become so worn as to result in inefficient action by the scraper even though the other component parts of the scraper are quite capable of performing their normal function. For this reason the scrapers often incorporate a replaceable blade which is mounted on a main body portion of the scraper by attaching devices such as bolts and nuts, or pin arrangements. It is quite important that such attaching devices be shielded from abrasive action by the material being scraped and transported by the scraper in order that wear and deformation of the attaching devices is avoided, since such wear can produce undesirable free play between the blade and the body and such deformation is apt to complicate replacement of the blade. It is therefore a primary object of this invention to mount replaceable blades on a slushing scraper in a manner such that the attaching devices are well shielded from such abrasive action.

It is another object of this invention to mount replaceable blades on a slushing scraper in a manner such that the blades are retained on the scraper body in a positive and secure manner by attaching devices that are conveniently accessible so as to facilitate installation of the blade on and removal from the body of the scraper.

In accordance with this invention a T head bolt is utilized to pull and hold a tapered grooved scraper blade to a tapered flanged scraper body in the direction of their mating assembly in a manner such that the T head bolt is completely buried within the assembly, is non-rotatable while in the assembly, yet is easily rotated out of position when the scraper blade and body are disassembled; and to incorporate such structure in a slushing scraper in a novel manner is yet another object of this invention.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a side elevation view of an embodiment of a slushing scraper constructed in accordance with this invention;

FIG. 2 is a plan view of the scraper illustrated in FIG. 1;

FIG. 3 is an enlarged fragmentary plan view showing the relative positions of a scraper blade and the scraper body just prior to assembling the blade on the body;

FIG. 4 is an enlarged fragmentary plan view showing the relative positions of a scraper blade and scraper body with the blade mounted on the body;

FIG. 5 is a sectional view taken in the direction of the arrows 5—5 in FIG. 4;

FIG. 6 is a sectional view taken in the direction of the arrows 6—6 in FIG. 4;

FIG. 7 is a detail view taken in the direction of the arrows 7—7 in FIG. 5;

FIG. 8 is a plan view of a center blade adapted to be mounted at the center of the scraper illustrated in FIGS. 1 and 2;

FIG. 9 is an end elevation view of the center blade illustrated in FIG. 8;

FIG. 10 is an enlarged sectional view taken in the direction of the arrows 10—10 in FIG. 8;

FIG. 11 is a detail view taken in the direction of the arrows 11—11 in FIG. 10;

FIG. 12 is a plan view of a T head bolt utilized in mounting the scraper blade on the scraper body in the manner illustrated in FIGS. 3 and 4;

FIG. 13 is an end view of the bolt illustrated in FIG. 12;

FIG. 14 is an end view of an end blade adapted to be mounted at one end of the scraper illustrated in FIGS. 1 and 2;

FIG. 15 is a plan view of the end blade illustrated in FIG. 14;

FIG. 16 is an enlarged fragmentary end view taken in the direction of the arrows 16—16 in FIG. 14;

FIG. 17 is an enlarged fragmentary sectional view taken in the direction of the arrows 17—17 in FIG. 14; and FIG. 18 is a fragmentary front view of one end of the slushing scraper with the blade member removed and is taken in the direction of the arrows 18—18 in FIG. 1.

Referring now to FIGS. 1 and 2 of the drawings, there is illustrated a slushing scraper which is designated generally by the reference numeral 21. The slushing scraper 21 comprises a main body member 22 which is preferably fabricated as a unitary member, usually being a single casting. The body member 22 includes bottom, side, and top walls which are curved forwardly from a rearmost wall so as to define a generally concavely shaped chamber within the interior of the body member. At the back of the body member 22 a pair of centrally located and vertically aligned lugs 23 and 24 afford a means for attaching return lines to the scraper. A pair of generally horizontally projecting lugs 26 and 27 project rearwardly from the end portions of the body member and are adapted to have control lines attached thereto.

The scraper 21 is pulled in a forward direction, leftward as illustrated in FIGS. 1 and 2, by a drag line which may be attached to a connecting plate 28 at one or more of three apertures 29 which are formed adjacent the forward edge of the plate. A pair of arm members 31 and 32 are each connected at opposite ends to the plate 28 and the body member 22 by volts 33 and 34 respectively. As best viewed in FIG. 2 the arm members 31 and 32 engage the sides of the body member and are curved so as to form a yoke with the connecting plate 28. A shoe 36 may be mounted on the lower part of the connecting plate 28 to afford a skid for this portion of the slushing scraper.

In accordance with this invention three scraper blades 37, 38, and 39 are mounted on the lowermost part of the body member 22 by means which enable the blades to be readily attached to, or removed from, the body member. Broadly, these means comprise a grooved construction in the upper edge end of each scraper blade, which construction is adapted to receive a depending flange of the body member, and a bolt and nut arrangement which is adapted to be substantially entirely disposed within the interior of the blades and body member so that the flashing means is effectively shielded from abrasive contact with the material being scraped and conveyed by the scraper. The general relationship and disposition of these component parts is illustrated in dash outline in FIGS. 1 and 2. The specific construction of the body and blade members and the fastening means will now be described in detail with reference to the other figures of the drawings hereinbelow.

Referring now to FIG. 18, an end portion of the body member 22 is shown with the blades 38 and 39 removed. In FIG. 18 the body member is seen to have a depending flange, designated by the reference numeral 41, which extends laterally across the entire width of the body member 22 and projects downwardly and forwardly from the body member. At either end the flange 41 is curved upwardly in end portions 41E. The main, laterally extending portion of the flange 41 tapers slightly from the area of juncture with the body member to the forward and rounded edge of the flange. The end portions 41E of the flange are, however, substantially uniform in thickness. A plurality of bolt receiving slots 42 are formed in the laterally extending portion of the flange. Each slot opens in the rounded forward edge of the flange and extends rearwardly into the flange in a direction transverse to the forward rounded edge of the flange. The body member 22 also includes a plurality of generally rectangular-shaped openings 43 which extend between the upper and lower surfaces of the lower portion of the bottom wall of the body member which is closely adjacent the depending flange 41. Each of these openings 43 is aligned with a corresponding slot 42 and communicates with the slot through a bore 44. Each bore 44 opens at one end into the base face of the associated slot 42 and at the other end into the forwardmost face of an opening 43. A forwardmost face 43F of each opening 43 affords a seat for a nut which is threaded on a bolt received within a slot 42 and the associated bore 44 whenever a blade member is mounted on the body member, as described in greater detail hereinafter.

Referring now to FIGS. 8–11, the construction of the center blade 38 will be described in detail. As best illustrated in the end view of FIG. 9, the blade 38 includes a pair of spaced-apart lip flanges 46 and 47 which define a tapered groove 48 therebetween. The taper of the groove 48 is complementary to the taper of the depending flange of the body member. At the end opposite the lip flanges 46 and 47 the blade member 38 terminates in a sharp edge 49 which is the edge effective to dig into the material to be scraped and conveyed by the slushing scraper.

Adjacent each end of the blade 38, the flange members 46 and 47 are formed with openings 51 and 52, respectively, which are recessed beneath the sides of the groove 48. These recessed openings are equally spaced from the outermost ends of the lip flanges 46 and 47 so as to be aligned one with the other and are adapted to receive a T head bolt 53 (see FIGS. 12 and 13). This T head bolt has a width slightly less than that of the groove 48 so that the T head of the bolt may be inserted lengthwise within the groove and rotated within the recessed openings 51 and 52 to a position wherein the long dimension of the T head engages the uppermost surfaces 51U and 52U of the respective openings, see FIG. 10. As best illustrated in FIG. 11, an inner corner portion of the recess 51 is rounded at 54 and the diagonally opposed corner portion of the recess 52 is rounded at 56 to enable the T head of the bolt 53 to be thus rotated from the groove 48 to the recessed openings. Also as illustrated in FIG. 11, the recessed openings 51 and 52 include side walls 51S and 52S, respectively, which afford abutments for limiting this rotational movement of the T head bolt.

Preferably, a reinforcing web section 57 extends transversely across the portion of the groove 48, projecting beneath the recessed openings 51 and 52. This web section is of the same thickness as the T head bolt so as to be readily received within the slots 42 in the body member flange 41 whenever the blade member is assembled on the body member.

Referring now to FIGS. 14–17, the construction of the end blade 39 will be described in detail. As best illustrated in the plan view of the FIG. 15, the end blade 39 comprises a base portion 39B which extends laterally and parallel with the center blade 38, and an upwardly curved end portion 39E, which, in effect, forms a continuation of a side wall of the main body member 22. The base portion 39B includes spaced-apart lip flanges 58 and 59 which define a tapered groove 61 therebetween. Recessed openings 62 and 63 in the respective lip flanges 58 and 59 afford an enlarged chamber in which a T head bolt like bolt 53 may be rotated and also afford a recessed surface which may be engaged by a T head bolt to draw the end blade member into mating engagement with the body member flange. This lip flange, tapered groove, and recessed opening construction is in all respect essentially similar to the corresponding structure incorporated in the center blade 38 as illustrated and described in detail in FIGS. 10 and 11. Also like blade 38, the end blade 39 may preferably incorporate a reinforcing web 64 which extends across the groove 61 in the portion immediately beneath the recessed openings 62 and 63.

The upwardly curved end portion 39E is also formed with a groove 61E in the rearward edge thereof. As best viewed in FIG. 16, the groove 61E is continuous with the laterally extending tapered groove 61. However, the groove 61E is of constant width throughout so as to be adapted to receive the upwardly curved portion 41E of the body member flange, as illustrated in FIG. 18. As viewed in FIG. 14, the groove 61E diminishes in height in a direction proceeding from the rearward toward the forward portion of the blade member in accordance with the similar construction of the body member flange.

The end blade member 39 includes a forward edge 65 which extends laterally, like the edge 49, of the center blade, and the end blade member also includes an edge 66 which is angled forwardly and extends between the outermost end of the blade edge 65 and a forwardly projecting portion of the end blade 39E.

While the end blade 39 is retained on the body member 22 by a T head bolt illustrated in FIGS. 12 and 13, it should be noted that the manner in which the groove 61E receives the corresponding portion 41E of the body member flange affords a clamping action which opposes any tendency for the end blade member to move laterally of the body member. This, of course, prevents resulting shearing stresses from being developed in the bolt head.

The construction of the end blade 37 is like that described in detail with respect to the blade 39 hereinabove.

Referring now to FIGS. 3–7, the manner in which the various elements of the fastening means of this invention coact with one another will be described in greater detail. In these figures a portion of the center blade and the body member are illustrated, and insofar as the parts illustrated in these figures correspond to like parts in the other figures of the drawings like reference numerals are used.

To initiate assembly of a blade member on the body member, a T head bolt is inserted within the tapered groove of the blade member and is rotated 90° within the enlarged chamber afforded by the recessed openings to a position wherein the bolt is prevented from further rotation by the abutments formed within the recessed openings. In this position the long dimension of the bolt extends across the tapered groove and the projecting ends of the bolt are effective to engage recessed surfaces in the openings for pulling the blade member into the mating engagement with the body member. This is the position of the bolt 53 within the blade member 38 as illustrated in FIG. 3. The threaded end of the bolt is then inserted within the slot 42 of the body member and the blade member 38 is positioned on the body member in a manner such that the lip flanges 46 and 47 engage the exterior surface of the flange 41, as best illustrated in FIG. 5. Such movement of the bolt 53 within the slot 43 positions the head of the bolt within the slot in a manner such that the sides of the slot locate the bolt head against rotation in either direction, and this disposition of the bolt in the slot is best illustrated in FIG. 6.

In the assembled position of the blade and body members illustrated in FIGS. 4–7 the threaded end of the bolt projects through the bore 44 at a short distance within the opening 43. A pair of nuts 40 are threaded on this end of the bolt and are seated on the surface 43F of the opening in the body member. By tightening the nuts 40 the blade member is pulled into tight engagement with the body member. Thus, by using bolts instead of wedges or the like, tight engagement of the blade member on the body member is insured without the necessity of resorting to precision grinding or gauging to retain interchangeability of replacement parts.

Preferably, as illustrated in FIG. 7, the sides of the opening 43 diverge slightly from the top to the bottom of the opening to facilitate movement of a wrench within the opening.

Thus, the replaceable blade members 37, 38, and 39 are mounted on the body member 22 of the scraper 21 in a novel manner such that the means fastening the blade members to the body member are recessed within the scraper so as to be well shielded from abrasive action but are nevertheless readily accessible to facilitate installation and removal of the blades. The fastening means, in each instance, incorporate a T head bolt and a pair of recessed openings in the blade member which are constructed to have abutment surfaces for positioning the bolt in the desired angular position within the openings. The body member 22 is formed with a slotted flange which is effective to lock the T head bolts against rotation whenever the blade and body members are assembled. End blades are formed with an upwardly curved groove which coacts with a similarly curved portion of the body member flange for providing a clamping action which is effectiv to prevent lateral movement of the end blades on the body member whenever these blades are assembled on the body member.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A slushing scraper comprising, a body member which includes a flange extending laterally across the scraper and curved upwardly at the ends thereof, a center and two end blade members each having a laterally extending groove which is shaped complementary to said flange for mounting the blade members on the body member, the end blade members having upwardly curved portions which include a groove continuous with the laterally extending groove and curved upwardly for receiving a curved end portion of the body member flange, and fastening means for retaining each of the blade members on the body member, comprising bolt means extending within each of said laterally extending grooves so as to be shielded from abrasive action by material scraped and conveyed by said slushing scraper, said bolt means each having an asymmetrical head permitting insertion of the bolt through said groove for rotation to a position wherein said head engages the side walls of a slot in the body member flange, upon insertion of the flange into said groove, for drawing the blade and body members into mating assembly.

2. A slushing scraper comprising, a body member which includes a flange extending laterally across the scraper, said body member having an opening extending therethrough, said flange having a slot formed therein which communicates with the opening in the body member, a blade member including a pair of lip flanges defining a laterally extending groove which is shaped complementary to said body member flange and adapted to receive the body member flange therein for mounting the blade member on the body member, said lip flanges being effective to shield the slot whenever the blade member is mounted on the body member, and fastening means for retaining the blade member on the body member comprising bolt means extending within said slot so as to be shielded by the lip flanges and nut means disposed internally of the body member within said opening so as to be shielded by the body member from abrasive action, said bolt means having an asymmetrical head permitting insertion of the bolt through said groove and rotation of the bolt to a position wherein said head engages the side walls of the slot in the body member, upon insertion of the body member flange into the blade member groove, for drawing the blade and body members into mating assembly.

3. A slushing scraper comprising; a body member forming a rearward portion of said scraper and having a laterally extending flange which projects forwardly and downwardly from the body member, and a slot opening in a forward edge of the flange and extending rearwardly within the flange and transversely to the forward edge; a blade member having two spaced apart lip flanges defining a laterally extending groove which is shaped complementary to the body member flange for mounting the blade member on the body member, said lip flanges having internally recessed surfaces extending transverse to the sides of the grooves and fastening means for retaining the blade member on the body member comprising a T head bolt insertable within the groove and rotatable to a position wherein the T head of the bolt engages the internally recessed surfaces for drawing the blade member toward mating assembly with the body member with the bolt disposed within the slot in the body member flange, the sides of the slot being effective to abut the T head and lock the bolt against rotation whenever the blade member is mounted on the body member, whereby the slot and bolt are shielded by the lip flanges whenever the blade member is so mounted on the body member.

4. A slushing scraper comprising; a body member forming a rearward portion of said scraper and having, a laterally extending flange which projects forwardly and downwardly from the body member, a slot opening in a forward edge of the flange and extending rearwardly within the flange and transversely to the forward edge, an opening extending through the body member rearwardly of the slot, and a bore communicating the slot with the opening; a blade member having two spaced apart lip flanges defining a laterally extending groove therebetween, which groove is shaped complementary to the flange for mounting the blade member on the body member, each lip flange having an opening recessed in the inner surfaces of the lip flanges; and fastening means for retaining the blade member on the body member comprising a T head bolt, the T head of said bolt being insertable within the groove and rotatable to a position wherein the T head is effective to engage a side of each opening in each lip flange to draw the blade member toward mating assembly with the body member, the sides of said slot being effective to lock the bolt against rotation whenever the blade member is mounted on the body member; said fastening means also comprising a nut threaded on the bolt and disposed within the opening in the body member so that the fastening means are effectively shielded by the body and blade members.

5. In a slushing scraper of the type including a body member and a replaceable blade member, means for mounting the blade member on the body member comprising, a flange on the body member, a pair of spaced apart lip flanges on the blade member defining a groove therebetween and adapted to receive the body member flange in the groove thus defined to assemble the two members one to another, said body member flange having a slot formed therein, said lip flanges having recessed openings in the sides of said groove, and a T head bolt having a width slightly less than that of the groove so as to be insertable in the groove and rotatable within the recessed openings to a position wherein the T head engages recessed surfaces of the recessed openings for drawing the blade member toward mating assembly with the body member with the bolt disposed within said slot.

6. In a slushing scraper of the type including a body member and a replaceable blade member, means for mounting the blade member on the body member comprising, a flange on the body member, a pair of spaced apart lip flanges on the blade member defining a groove therebetween and adapted to receive the body member flange in the groove thus defined to assemble the two members one to another, said body member flange having a slot formed therein, said lip flanges having recessed openings in the sides of said groove, and a T head bolt having a width slightly less than that of the groove so as to be insertable in the groove and rotatable within the recessed openings to a position wherein the T head engages recessed surfaces of the recessed openings for drawing the blade member toward mating assembly with the body member with the bolt disposed within said slot, the width of said slot being slightly greater than the width of the T head of the bolt so that the slot is effective to prevent rotation of the bolt in the assembled position of the body and blade members.

7. In a slushing scraper of the type including a body member and a replaceable blade member, means for mounting the blade member on the body member comprising, a flange on the body member, a pair of spaced apart lip flanges on the blade member defining a groove therebetween and adapted to receive the body member flange in the groove thus defined to assemble the two members one to another, said body member flange having a slot formed therein, said lip flanges having recessed openings in the sides of said groove, and a T head bolt having a width slightly less than that of the groove so as to be insertable in the groove and rotatable within the recessed openings to a position wherein the T head engages recessed surfaces of the recessed openings for drawing the blade member toward mating assembly with the body member with the bolt disposed within said slot, the blade member having abutment surfaces within the recessed openings for limiting the amount of rotation of the T head within said openings.

References Cited in the file of this patent

UNITED STATES PATENTS

| | | |
|---|---|---|
| 1,595,112 | Mentzer | Aug. 10, 1926 |
| 1,707,426 | Baker | Apr. 2, 1929 |
| 1,802,106 | Bosworth | Apr. 21, 1931 |
| 1,995,062 | Gray et al. | Mar. 19, 1935 |
| 2,167,425 | Page | July 25, 1939 |
| 2,390,611 | Nixon | Dec. 11, 1945 |
| 2,393,706 | Page | Jan. 29, 1946 |
| 2,626,471 | Whisler | Jan. 27, 1953 |
| 2,716,824 | Francis | Sept. 6, 1955 |